(12) United States Patent  
Arunan et al.

(10) Patent No.: US 7,715,885 B2  
(45) Date of Patent: May 11, 2010

(54) POWER SAVING SYSTEM IN DISTRIBUTED WIRELESS PERSONAL AREA NETWORK AND METHOD THEREOF

(75) Inventors: Thenmozhi Arunan, Bangalore (IN); Sunil Dilipkumar Jogi, Bangalore (IN); Manoj Choudhary, Bangalore (IN); Balaji Srinivas Holur, Bangalore (IN); Prashant Wason, Bangalore (IN); Yong-suk Kim, Deajeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 11/151,517

(22) Filed: Jun. 14, 2005

(65) Prior Publication Data

US 2005/0288069 A1    Dec. 29, 2005

(30) Foreign Application Priority Data

Jun. 14, 2004  (IN)  ............................. 553/CHE/04  
Dec. 23, 2004  (KR)  ..................... 10-2004-0111380

(51) Int. Cl.  
*H04M 1/00*   (2006.01)

(52) U.S. Cl. ...................... 455/574; 455/41.2; 455/95; 455/414.1

(58) Field of Classification Search ......... 370/310–350; 455/41.2–41.3, 574, 343.2–343  
See application file for complete search history.

(56) References Cited

U.S. PATENT DOCUMENTS 6,480,476 B1 * 11/2002 Willars ...................... 370/311  
6,754,250 B2 *  6/2004 Haartsen .................... 375/132  
2003/0152059 A1 *  8/2003 Odman ...................... 370/338  
2005/0064818 A1 *  3/2005 Assarsson et al. .......... 455/41.2

(Continued)

FOREIGN PATENT DOCUMENTS

JP          11266254 A       9/1999

(Continued)

OTHER PUBLICATIONS

Ivan Sartini, et al., *Power Saving ADHOC: a MAC Protocol for Multihop Wireless Ad Hoc Networks*, Vehicular Technology Conference, 2004, VTC 2004-Spring 2004, IEEE 59th vol. 3, May 17-19, 2004, p. 1603-1606.

Yu-Chee Tseng, et al., *Power-Saving Protocols for IEEE 802.111-Based Multi-Hop Ad Hoc Networks*, INFOCOM 2002, Twenty-First Annual Joint Conference of the IEEE Computer and Communications Societies, Proceedings, IEEE vol. 1, Jun. 23-27, 2002, p. 200-209.

*Primary Examiner*—Nghi H Ly  
*Assistant Examiner*—Amancio Gonzalez  
(74) *Attorney, Agent, or Firm*—Sughrue Mion, PLLC (57) ABSTRACT

A power saving system in distributed wireless personal area network and a method thereof are disclosed. A PS (Power Save) anchor that provides information about hibernating devices to a beacon group through power save information elements in media access control for a wireless personal area network based on a wireless mobile ad-hoc network. Accordingly, all devices in the given wireless personal area network can schedule their active modes and hibernating modes according to hibernating intervals of destination devices with which the devices want to communicate. This can effectively reduce the necessity of the devices' waiting for the destination devices to awake from the hibernating mode as the devices maintain their idle state, and thus the power consumption of all the devices in the network can effectively be reduced.

49 Claims, 6 Drawing Sheets

U.S. PATENT DOCUMENTS

2005/0135306 A1* 6/2005 McAllen et al. ............ 370/329
2008/0232286 A1* 9/2008 Habetha et al. ............ 370/311

FOREIGN PATENT DOCUMENTS

| JP | 200387185 A | 3/2003 |
| JP | 2003134040 A | 5/2003 |
| WO | 03/056870 A1 | 7/2003 |
| WO | 2004/023241 A2 | 3/2004 |

* cited by examiner

| 1 | 1 | K | 3N |
|---|---|---|---|
| Element ID | Length | HDBSB | HI |

PSIE

FIG. 5A

| a | b | c | d |
|---|---|---|---|
| n | 3 | 1 | 1 |
| Wakeup-interval | PS-beacon | Length | Element ID |

POWER SAVING SYSTEM IN DISTRIBUTED WIRELESS PERSONAL AREA NETWORK AND METHOD THEREOF

CROSS-REFERENCE TO RELATED APPLICATIONS

This application claims benefits of Indian Patent Application No. 553/CHE/2004, filed on Jun. 14, 2004; and Korean Patent Application No. 2004-111380, filed on Dec. 23, 2004, the entire contents of which are incorporated herein by reference.

BACKGROUND OF THE INVENTION

1. Field of the Invention

The present invention relates to a power saving system in a distributed wireless personal area network and a method thereof, and more particularly to a power saving system in a distributed wireless personal area network and a method thereof that can provide a media access control for power saving in a wireless personal area network based on a mobile ad-hoc network.

2. Description of the Related Art

A WPAN (Wireless Personal Area Network) is defined as a network that operates in a personal area of about 10 m. IEEE (Institute of Electrical and Electronics Engineers) participated in determining the standard for such a wireless personal area network. A UWB (Ultra Wide Band) communication technology can provide a transmission rate of more than several hundred megabits per second (Mbps) in such a personal area network. In a WPAN, media are shared among all devices for mutual communications. If possible, the respective devices attempt to be in a power save state to reduce their battery power consumption.

This requires a media access control method for controlling the media access of the devices, which includes, in a broad sense, how to access the network, how to transmit data to other devices at a desired transmission rate, how to optimally use the media, how to detect and dissolve collisions of beacons, and how to optimally use the power.

The media access control method for a WPAN may be classified into a centralized access method and a distributed access method. According to the centralized access method, one device operates for the whole network in order to manage and control the media access for all devices. All devices request the help of a centralized coordinator for their media access such as network participation and channel time allocation. According to the distributed access method, the media access is uniformly distributed over all devices in the network, and all the devices share the burden of managing their mutual media access.

Figure 1:
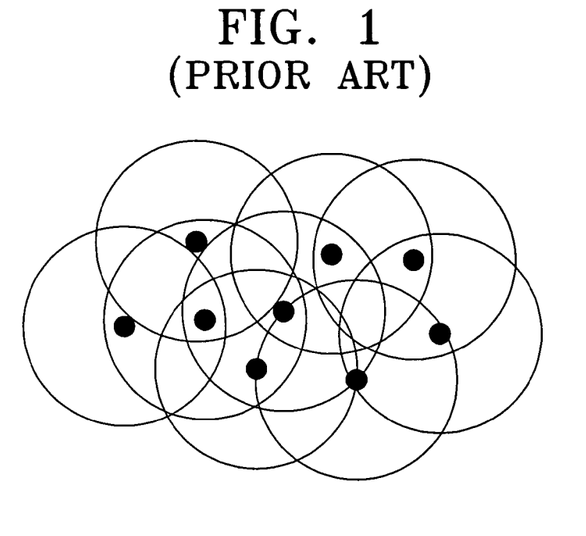
FIG. 1 is a view illustrating a WPAN according to a conventional distributed access method.

FIG. 1 is a view illustrating a WPAN according to the conventional distributed access method.

Referring to FIG. 1, the WPAN includes many devices that are indicated as points. Circles drawn around the respective devices indicate ranges in which beacons of the corresponding devices are received, respectively. Additionally, the devices included in a circle form a beacon group.

The WPAN based on the distributed access method does not have any centralized coordinator. In the network, a separate dedicated coordinator is not included, but all devices serve as light coordinators that cooperate with one another. Also, the respective devices share information required for performing the media access control such as a channel time allocation, sync method, power saving, etc., for data transmission to other devices. This network system is called an ad-hoc type distributed wireless personal area network system. The respective devices periodically broadcast information about their peripheral devices and information about channel times allocated to the peripheral devices.

The distributed media access control method depends on a timing concept called 'superframe'. This superframe has a time of a fixed length, and is divided into a plurality of time windows that are called 'time slots'. These time slots are called MASs (Medium Access Slots).

Some slots are used for the devices to send beacons, and the remaining slots are used to send data. The slots that send the beacons are called 'beacon slots', and the slots that send the data are called 'data slots'. The length of a BP (Beacon Period) may be shorter than the length of a data period. The beacon slots appear along with the start part of the superframe. In addition, the number of beacon slots can be changed according to the number of devices connected.

Figure 2:
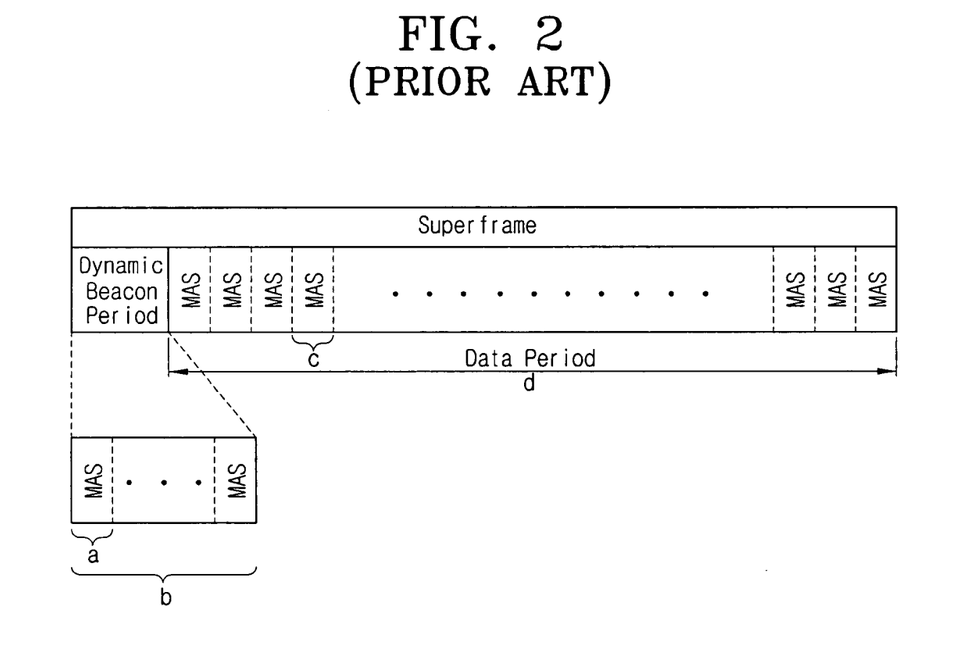
FIG. 2 is a view illustrating an example of a conventional superframe structure.

FIG. 2 is a view illustrating an example of a conventional superframe structure.

The superframe structure as illustrated in FIG. 2 is based on what is defined by the Multiband OFDM (Orthogonal Frequency Division Modulation) Alliance. A superframe is composed of two types of MASs (Medium Access Slots). One type is a beacon slot MAS (a) and the other type is data slot (c). A beacon period (b) is composed of beacon slot MASs according to the number of devices connected in the same beacon group. The remaining part of MASs, which includes the MAS c, constitute a data period (d) composed of media access slots that can be used by devices in the network in order to transfer data to other devices in the network.

256 MASs (i.e., beacon slots and data slots) constitute a superframe of 65.536 ms, and the respective duration of MAS corresponds to 256 μs. Information of the superframe structure can be broadcasted in the beacons being broadcasted by the respective devices. The start time of the superframe is determined by the start of the beacon period, and is defined as a BPST (Beacon Period Start Time).

The devices that belong to the same beacon group use the same beacon period start time for the superframe.

The devices can put information to IEs (Information Elements) such as BPOIEs (Beacon Period Occupancy Information Elements) in beacons, and then the information can be broadcasted to the respective devices that belong to the same beacon group. The information of occupancy state of the beacon slots in the beacon period can be broadcasted through BPOIEs in beacons. The beacon period occupancy information just includes beacon information of the devices that belong to the same beacon group.

Right after the reception of the beacon frame, the device stores a sender's DEVID (Device ID) and a slot number which are in the received beacon. The device also includes this information in the BPOIE to be transmitted during the next superframe. The information of the beacons received during a present superframe is included in the beacon period occupancy information to be sent during the next superframe.

If the device ID of a certain device could not be shown in the beacon period occupancy information of a neighboring device beacon during a predefined number of successive superframes, this means that the corresponding device will change the corresponding beacon slot to an idle slot during the next superframe. Even if the beacon slot is changed, DRP (Distributed Reservation Protocol) can be maintained, and no re-negotiation is required.

In the conventional superframe structure, the MBOA-MAC (Multiband OFDM Alliance Medium Access Control) is defined as two operation modes: an active mode and a hibernating mode which is a power saving mode. In the active mode, a device can be in an awake state or it also can be in a sleep state in order to reduce the power consumption. In the awake state, even if a transmitting part and a receiving part of the device are not in a transmission state and in a reception state, respectively, they consume normal operating power. In the sleep state, the device uses the minimum power by turning off the power supplied to the transmitting part and the receiving part of the device. In the active mode, the devices can switch the awake state to the sleep state and vice versa according to the data reservations pre-declared in the beacon period.

A more efficient power save method is the hibernating mode. The devices in the hibernating mode declare that they will be in the hibernating mode for several superframes through their beacons. In the hibernating mode, the devices are in a deep hibernating state and do not transmit or receive beacons.

Other devices in the corresponding beacon group should give attention to such a declaration, and continuously should include the information about the hibernating devices in their beacon period occupancy information until the hibernating devices awake. Additionally, the devices in the beacon group should maintain the information about the hibernating devices in their local databases, and defer communications with the hibernating devices until the hibernating devices start to operate and send beacons.

However, as discussed in the MBOA MAC v0.5 specification, the conventional method has problems in that if there is any device that does not confirm the beacon through which a certain device has declared its intention to proceed to the hibernating mode, the device does not know when the hibernating device will return to its active mode.

If such a device wants to communicate with the hibernating device, the device should be in an awake state for a long time in order to confirm in which superframe the hibernating device will awake.

By contrast, even if the hibernating device awakes from hibernation mode and enters the active mode, the device does not know whether other devices have proceeded to the hibernating state during the hibernation period of the device itself. Accordingly, the device may continuously remain active for a long time in order to communicate with such devices, and this long waiting time causes the power conservation of the corresponding device to be abruptly decreased.

The above-described situation may occur more frequently in the case of a beacon group having a high-degree of mobility.

SUMMARY OF THE INVENTION

The present invention has been developed in order to address the above drawbacks and other problems associated with the conventional arrangement.

An aspect of the present invention is to provide a power saving method in a distributed wireless personal area network and a method thereof that can reduce the power consumption of a system by distributing power saving information elements of respective devices in the UWB (Ultra Wide Band) wireless personal area network based on a wireless ad-hoc network of a non-centralized network topology.

The forgoing and other objects and advantages are substantially realized by providing a power saving method in a distributed wireless network. According to the present invention, the method comprises: at least one device P becoming a PS (Power Save) anchor, and the PS anchor broadcasting device operation information which is the information about operation state of devices in a beacon group.

Preferably, but not necessarily, the device operation information comprises power save information comprising hibernation information about hibernating devices of the beacon group.

Preferably, but not necessarily, the hibernation information includes arrangement of information about the hibernating devices.

Preferably, but not necessarily, the information about the hibernating device is 3 bytes long.

Preferably, but not necessarily, the information about the hibernating device includes at least one of address information of the hibernating device and wake-up time information of the hibernating device which indicates a time that the hibernating device wakes up.

Preferably, but not necessarily, the wake-up time information of the hibernating device is about the number of remaining superframes before the hibernating device wakes up.

Preferably, but not necessarily, the address information of the hibernating device is 2 bytes long and the wakeup time information of the hibernating device is 1 byte long.

Preferably, but not necessarily, the power save information further comprises hibernation device beacon slot bitmap information which indicates the hibernating device by using a bitmap which contains mapped beacon slots of devices of the beacon group.

Preferably, but not necessarily, a bit of the bitmap is set to '1' for the beacon slot of the hibernating device.

Preferably, but not necessarily, the power save information further comprises at least one of information about the total length of the power save information, and an ID of the power save information.

Preferably, but not necessarily, the information about the total length of the power save information is 1 byte long, and the ID of the power save information is 1 byte long.

Preferably, but not necessarily, in the PS becoming step, the at least one device P voluntarily becomes the PS anchor.

Also, according to the present invention, a power saving method in a distributed wireless network, comprises: at least one device P becoming a PS (Power Save) anchor and broadcasting device operation information which is the information about operation state of devices in a beacon group.

Preferably, but not necessarily, the device operation information comprises power save information comprising hibernation information about hibernating devices of the beacon group.

Preferably, but not necessarily, the at least one device P voluntarily becomes the PS anchor.

The foregoing and other objects and advantages are substantially realized by providing a power saving method in a distributed wireless network based on a wireless mobile ad-hoc network. According to the present invention, the method comprises the steps of at least one device P voluntarily becoming a PS (Power Save) anchor and broadcasting information about operation state of devices in a beacon group, and at least one device in the beacon group grasping the operation state of the corresponding device with which the device will communicate on the basis of the information and waiting in a power save state until communication with the corresponding device becomes possible.

Preferably, but not necessarily, the network is a UWB (Ultra Wide Band) wireless personal area network.

Preferably, but not necessarily, at the broadcasting step, the device P selects a role of the PS anchor if presently operating PS anchors do not exist but at least one device that is not the device P exists in the beacon group.

Preferably, but not necessarily, at the broadcasting step, the device P selects a role of the PS anchor if presently operating PS anchors exist in the beacon group but all the devices in the beacon group cannot receive the information about the operation state from the presently operating PS anchor.

It is also preferable, but not necessary, that if the devices cannot receive the information about the operation state, there are combinations that are not simultaneously confirmed by the beacons broadcast by any one of the operating PS anchors among combinations each of which is composed of two certain devices in the beacon group.

It is preferable, but not necessary, that the device P either continuously receives power required for its operation or includes a power supply device that can provide the power required for its operation.

Preferably, but not necessarily, the device P may have sufficient memory to store the operation state of all the devices in the beacon group and at least one byte for the information in its own beacon.

Preferably, but not necessarily, the device P does not proceed to the power save state in which the device P does not transmit the beacon while the device P operates as the PS anchor.

Preferably, but not necessarily, the information about the operation state includes information about the devices that are in a hibernating mode as the devices existing in the beacon group and time points where the devices switch from the hibernating mode to an active mode.

Preferably, but not necessarily, the information about the operation state is in the form of an information element included in the beacon broadcast by the PS anchor.

Preferably, but not necessarily, the information element includes a field for indicating the hibernating device among the devices in the beacon group in the unit of at least one bit, and a field including information about a time point where the device switches from the hibernating mode to the active mode in the unit of at least one byte corresponding to the bit.

It is also preferable, but not necessary, that the information about the operation state is obtained by receiving the beacon of the device in the beacon group and the beacons of other PS anchors in the beacon group during at least one superframe.

Preferably, but not necessarily, the method further comprises the step of the device P operating as the PS anchor and then resigning the role of the PS anchor after a predetermined time.

Preferably, but not necessarily, the predetermined time corresponds to either of a case that other devices do not exist in the beacon group and a case that other operating PS anchors exist in the beacon group and all the devices in the beacon group can receive the information about the operation state from the other operating PS anchors.

In another aspect of the present invention, there is provided a power saving system in a distributed wireless network based on a wireless mobile ad-hoc network, comprising a device P for voluntarily selecting a role of a PS (Power Save) anchor that broadcasts information about operation state of devices in a beacon group, and a neighboring device that waits in a power save state until communication with the corresponding device becomes possible in accordance with the operation state of the corresponding device with which the device will communicate according to the information.

Preferably, but not necessarily, the network is a UWB (Ultra Wide Band) wireless personal area network.

Preferably, but not necessarily, the device P can select the role of the PS anchor if presently operating PS anchors do not exist but at least one device that is not the device P exists in the beacon group.

Preferably, but not necessarily, the device P can select the role of the PS anchor if presently operating PS anchors exist in the beacon group but all the devices in the beacon group cannot receive the information about the operation state from the presently operating PS anchors.

It is also preferable, but not necessary, that if the devices cannot receive the information about the operation state, there are combinations that are not simultaneously confirmed by the beacons broadcast by any one of the operating PS anchors among combinations each of which is composed of two certain devices in the beacon group.

It is preferable, but not necessary, that the device P either continuously receives power required for its operation or includes a power supply device that can provide the power required for its operation.

Preferably, the device P may have a memory sufficient to store the operation state of all the devices in the beacon group and at least one byte for the information in its own beacon.

Preferably, but not necessarily, the device P does not proceed to the power save state in which the device P does not transmit the beacon while the device P operates as the PS anchor.

Preferably, but not necessarily, the information about the operation state includes information about the devices that are in a hibernating mode as the devices existing in the beacon group and time points where the devices switch from the hibernating mode to an active mode.

Preferably, but not necessarily, the information about the operation state is in the form of an information element included in the beacon broadcast by the PS anchor.

Preferably, but not necessarily, the information element includes a field for indicating the hibernating device among the devices in the beacon group in the unit of at least one bit, and a field including information about a time point where the device switches from the hibernating mode to the active mode in the unit of at least one byte corresponding to the bit.

It is also preferable, but not necessary, that the information about the operation state is obtained by receiving the beacon of the device in the beacon group and the beacons of the other PS anchors in the beacon group during at least one superframe.

Preferably, but not necessarily, the device P can operate as the PS anchor and then resign the role of the PS anchor after a predetermined time.

Preferably, but not necessarily, the predetermined time corresponds to either of a case that other devices do not exist in the beacon group and a case that other operating PS anchors exist in the beacon group and all the devices in the beacon group can receive the information about the operation state from the other operating PS anchors.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will be described in greater detail with reference to the accompanying drawings.

In the following description, the same drawing reference numerals are used for the same elements even in different drawings. Descriptions of certain items such as construction details and elements are only provided to assist in a comprehensive understanding of the invention. Thus, it is apparent that the present invention can be carried out without those items described. Also, well-known functions or constructions are not described in detail since they would obscure the invention in unnecessary detail.

Figure 3:
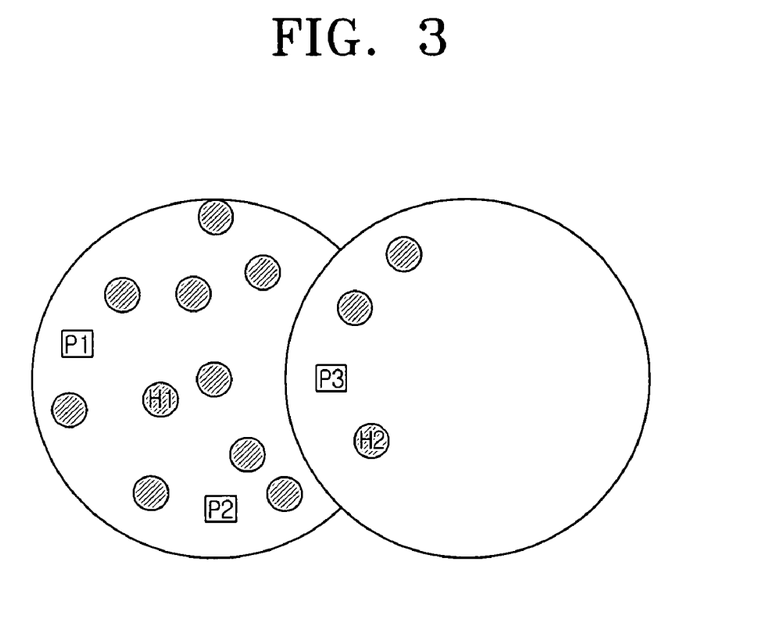
FIG. 3 is a view illustrating a network that includes a power saving system in a distributed WPAN consistent with the present invention.

FIG. 3 is a view illustrating a network that includes a power saving system in a distributed WPAN consistent with the present invention.

The power saving system consistent with the present invention may be included in a UWB (Ultra Wide Band) WPAN (Wireless Personal Area Network) based on a mobile ad-hoc network of a non-concentration and distribution method, and provides an improved MAC (Media Access Control).

The power saving system consistent with the present invention can determine when all devices switch over to a PS (Power Save) mode and when they awake for communications. Additionally, the power saving system knows information about devices that are in a hibernating mode (hereinafter referred to as 'hibernating devices') and information about how many superframes should pass in order for the respective hibernating device to awake. For this, the system can serve as a PS anchor.

Further, the present invention provides a method that enables a new device that newly enters into the beacon group and thus does not have information about the previous hibernating devices or the device that does not have the information about the presently hibernating devices due to its hibernation to know the hibernating devices in the beacon group and the superframe in which the hibernating device switches over to an active mode.

Referring to FIG. 3, two beacon groups are indicated as circles in a network. The two beacon groups have several devices including PS anchors P1, P2 and P3 and hibernating devices H1 and H2.

The PS anchors P1, P2 and P3 help to achieve a broadcast power save state of respective devices in the beacon groups through a network. That is, they broadcast information about the hibernating devices among the devices in the beacon groups and information about when the hibernating devices will awake (hereinafter referred to as a 'power save state') through the network.

All devices of the system consistent with the present invention can perform the function of a PS anchor, and at least one PS anchor may be included in a beacon group. Additionally, even a device that is presently operating as the PS anchor may resign the role of the PS anchor if it is not necessary any more.

The device in the network performs the process of selecting and resigning the role of the PS anchor without requiring any additional control message to be exchanged with neighboring devices and using information elements being broadcasted through the beacons.

Each of the PS anchors P1, P2 and P3 should have the following conditions.

First, it should continuously receive a stable power supply, or should be a power supply device that can provide such a power supply. Second, the PS anchor should have a sufficient memory to store the state of the hibernating devices in the beacon group. Third, the PS anchor should have sufficient spare bytes to send the information about the hibernating devices in the beacon. Last, the PS anchor should voluntarily perform the role of the PS anchor, and should not proceed to the power save mode while it operates as the PS anchor.

Each of the PS anchors P1, P2 and P3 includes a means for propagating information about the hibernating devices H1 and H2 and information about how many superframes should pass in order for the respective hibernating device to awake. For this, the PS anchors P1, P2 and P3 declare the power save state of the devices in their beacon groups using information elements called PSIEs (Power Save Information Elements) in their beacons. That is, the PS anchors P1, P2 and P3 broadcast the PSIEs in their beacon groups, respectively. The PSIE is information about operation state of devices in a beacon group.

Accordingly, it is not required for the devices that intend to communicate with the hibernating devices H1 and H2 to continuously maintain an active mode, and the devices can perform the time management for the hibernating state and the awake state in accordance with the power save state through the power save information elements. This results in all the devices having power save effects.

Figure 4A:
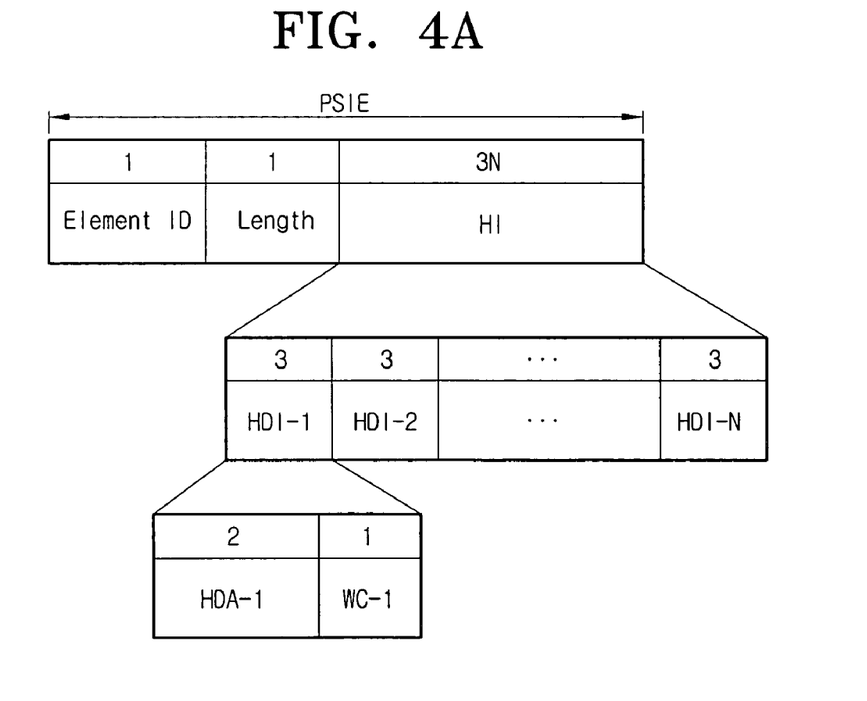
FIG. 4A is a view illustrating the structure of a power save information element according to an exemplary embodiment of the present invention.

FIG. 4A is a view illustrating the structure of the power save information element (PSIE) according to an embodiment of the present invention. Referring to FIG. 4A, the PSIE includes an Element ID field, a Length field, and a hibernation information (HI) field.

The Element ID indicates an ID of the PSIE, and the Length is information about a total length of the PSIE. Referring to FIG. 4A, the Element ID field is 1 byte long and the Length field is 1 byte long. However, this should not be considered as limiting. The lengths of the respective fields are variable as necessary.

The HI is about hibernating devices in the beacon group. The HI consists of N number of hibernating device information (HDI) sub-fields HDI-1 to HDI-N. 'N' corresponds to the number of hibernating devices existing in a beacon group of a corresponding PS anchor. Referring to FIG. 4A, a sub-field of the HDI is 3 bytes long, and accordingly, the HI field consisting of the N number of HDI sub-fields is 3N bytes long. Of course, the length of the HDI sub-field is variable as necessary.

The HDI includes address information and wakeup time information of the hibernating device. The address information identifies a hibernating device. That is, the address information is used to determine which device is the hibernating device.

The 'wakeup time information of the hibernating device' is about a time that a hibernating device wakes up and may be expressed by wakeup countdown (WC) information. The WC information is about the number of remaining superframes before the hibernating device wakes up. For example, if the 'WC' is '2', the hibernating device wakes up after two superframes, and if the 'WC' is '0', the hibernating device wakes up in the next superframe.

In brief, as shown in FIG. 4A, the HDI sub-field consists of a hibernating device address (HDA) sub-field and a WC sub-field. The HDA sub-field is 2 bytes long, and the WC sub-field is 1 byte long. The lengths of the HDA sub-field and the WC sub-field are variable as necessary.

Figure 4B:
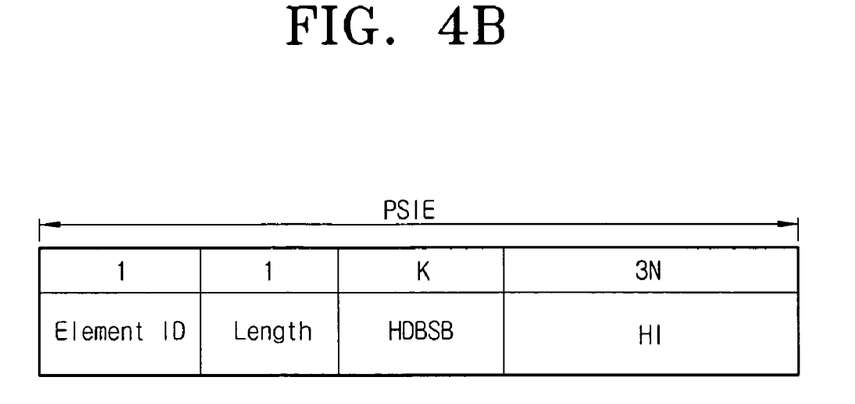
FIG. 4B is a view illustrating the structure of a power save information element according to another embodiment of the present invention.

FIG. 4B is a view illustrating the structure of a PSIE according to another embodiment of the present invention. Referring to FIG. 4B, the PSIE includes an Element ID field, a Length field, a hibernating device beacon slot bitmap (HDBSB) field, and a HI field.

Since the Element field, the Length field, and the HI field are the same as those of FIG. 4A, their descriptions are omitted. Hereinafter, description is made only about the HDSBS field. As shown in FIG. 4B, the HDBSB field is K bytes long. The 'K' is variable as necessary.

The HDBSB is information that indicates a hibernating device by using a bitmap which contains mapped beacon slots of the devices of a beacon group. More specifically, bits of the HDBSB are set to '1' for the beacon slot of the hibernating device.

For example, if $1^{st}$, $4^{th}$ and $16^{th}$ bits of the HDBSB are set to '1', devices which transmit beacons through $1^{st}$, $4^{th}$, and $16^{th}$ beacon slots are determined to be hibernating devices.

Figure 5A:
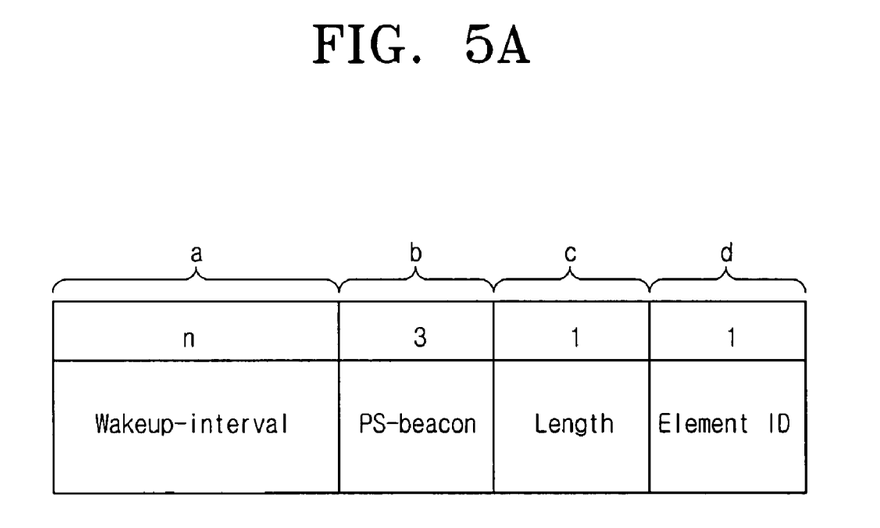
FIG. 5A is a view illustrating the structure of a power save information element according to still another embodiment of the present invention.

FIG. 5A is a view illustrating the structure of a power save information element according to still another embodiment of the present invention.

Referring to FIG. 5A, the power save information element includes fields of a wakeup interval (a), a PS beacon (b), a length (c) and an element ID (d).

The power save information element includes information about the hibernating devices and information about how many superframes should pass in order for the respective hibernating device to be awake. The length of the fields is variable, and depends on the number of hibernating devices in the beacon group of the corresponding PS anchor.

The PS anchor can confirm the information about the hibernating devices to be included in the power save information element through the beacon previously received from the corresponding hibernating device and the beacon received through another PS anchor.

The wakeup interval (a) includes information about intervals at which the hibernating devices awake from the hibernating mode. The length of the wakeup interval (a) is variable according to the number of hibernating devices, and a one-byte field corresponds to one device.

The PS beacon (b) is a field for indicating the hibernating devices among the devices in the beacon group. The PS beacon (b) is a 24-bit bitmap that corresponds to a three-byte length. The respective bits in the PS beacon (b) are mapped so as to match the beacon slots in the beacon period.

The length (c) indicates the length of the entire power save information element, and the element ID (d) indicates the ID of the power save information element.

The power save information element that the PS anchor uses to declare the power save state of diverse devices in the beacon group through the network will now be explained with reference to FIG. 5B.

Figure 5B:
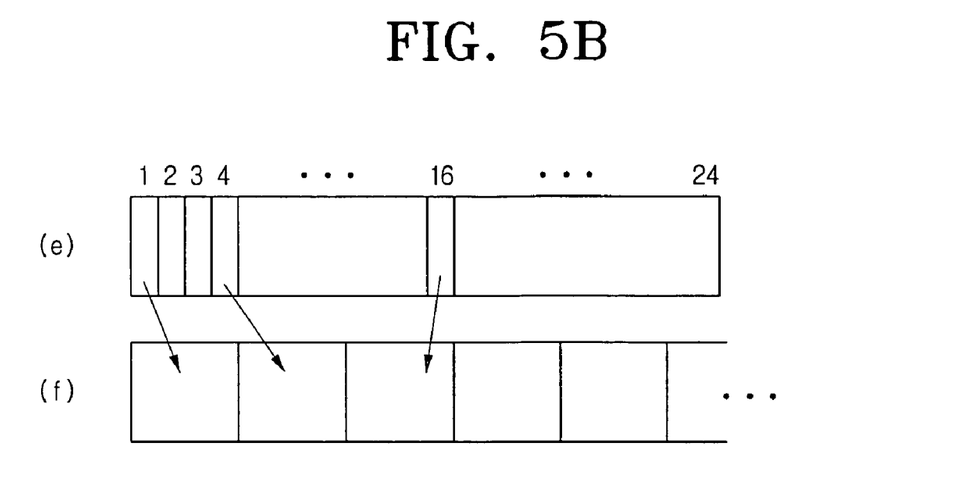
FIG. 5B is a view illustrating an individual field of the power save information element of FIG. 5A.

FIG. 5B is a view illustrating the individual field of the power save information element of FIG. 5A.

A PS beacon (e) illustrated in FIG. 5B as an example corresponds to the PS beacon (b) of FIG. 5A, and a wakeup interval (f) illustrated in FIG. 5B as an example corresponds to the wakeup interval (a) of FIG. 5A.

The PS beacon (e) is a bitmap that includes at least one bit. The PS beacon (e) may be represented as a bitmap having the number of bits that coincides with the whole number of the devices which can be included in the beacon group, and preferably corresponds to a field having a length of three bytes. The respective bits in the PS beacon (e) are mapped so as to coincide with the beacon slots in the beacon period. If any bit of the PS beacon is set to '1', it means that the device to which the slot corresponding to the bit is sending the beacon is a hibernating device.

The wakeup interval (f) is a successive field in the unit of one byte, and its size is variably determined according to the number of hibernating devices. The respective byte of the wakeup interval (f) contains information about the hibernating device and the hibernating mode.

The first byte value of the wakeup interval (f) corresponds to the first appearing entry among entries having a value of '1' in the bitmap of the PS beacon (e). Similarly, the second byte corresponds to the second appearing entry among the entries having a value of '1' in the bit field of the PS beacon (e). Accordingly, the respective byte of the wakeup interval (f) corresponds to the hibernating device that is the device having a value of '1' in the bitmap of the PS beacon (e), and includes information about the hibernating mode of the hibernating device corresponding to the respective byte.

Referring to FIG. 5B, it can be recognized that the devices, which send the beacon through the first, fourth and 16th beacon slots, are in the hibernating state through the PS beacon (e), and the information about the intervals at which the hibernating devices awake from the hibernating state is broadcast to the beacon group through the first to third bytes of the wakeup interval (f).

The respective devices in the beacon group can recognize the hibernating devices through the power save information element received from the PS anchor. Accordingly, any device that intends to communicate with the hibernating device can determine the switching time when the hibernating device switches over to a long power save mode and the time when the hibernating device awakes to the active mode. This type of scheduled sleep and awake can reduce the battery power consumption and increase the maintenance time of the ad-hoc network.

Hereinafter, a method whereby a certain device in the network voluntarily selects and resigns the role of a PS anchor will be explained.

As described above, the device having the characteristic of the PS anchor (hereinafter referred to as a 'device P') first judges whether any operating PS anchor exists in the beacon group of the device P in order to voluntarily operate as the PS anchor. This judgment may be performed in different ways according to the existence/nonexistence of the operating PS anchor.

For this, the device P receives the beacons from neighboring devices, and judges whether the PS anchor exists in the beacon group according to the received beacon.

Figure 6:
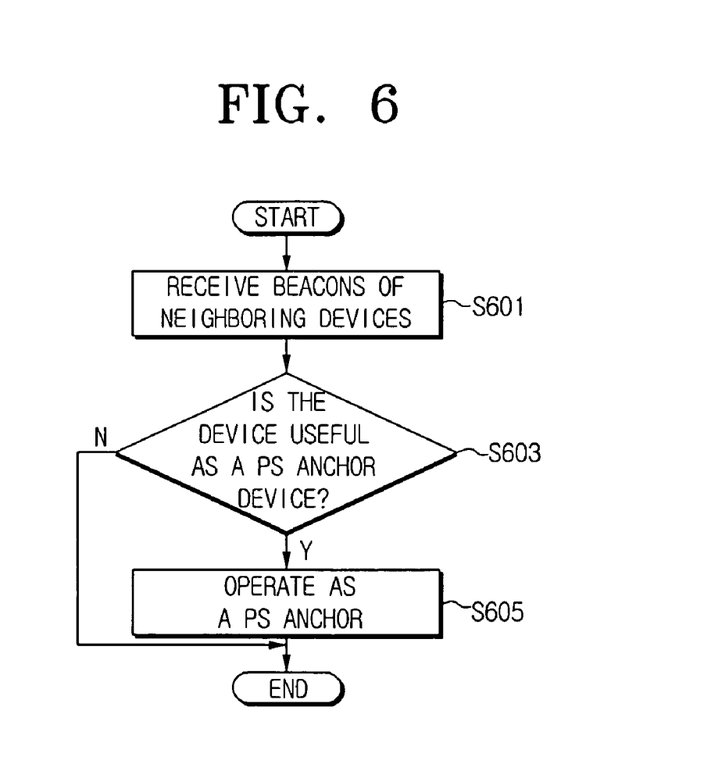
FIG. 6 is a flowchart explaining a method whereby a device P operates as a PS anchor if no PS anchor exists in a beacon group consistent with the present invention.

FIG. 6 is a flowchart explaining the method whereby the device P operates as a PS anchor if no PS anchor exists in the beacon group according to the present invention.

If it is judged that the PS anchor does not exist in the beacon group, the device P should check whether it can provide the power save information element for at least one neighboring device in the beacon group. That is, the device P judges whether any operating device exists in its beacon group.

The device P receives the beacon from the neighboring devices in the beacon group (step S601), and judges whether other devices exist in its beacon group. The device P can easily judge the existence of other devices in its beacon group using the BPOIC (Beacon Period Occupancy Information Element) individually received from the neighboring devices (step S603).

If it is judged that such devices exist, it is useful to the network that the device P operates as the PS anchor, and the device P can voluntarily become the PS anchor (step S605).

Hereinafter, a method whereby the device P operates as a PS anchor if presently operating PS anchors exist in the beacon group will be explained with reference to FIGS. 7 and 8.

If PS anchors exist in the beacon group of the device P, it should be checked if all neighboring devices of the device P are served by the PS anchors.

Two certain devices in the beacon group of the device P may attempt to communicate with each other, and one of them may be a hibernating device. Accordingly, such two devices should simultaneously be confirmed by one of the operating PS anchors. Otherwise, the two devices cannot confirm each other's state.

The device P judges such situations using the beacon period occupancy information of the neighboring devices and the beacon period occupancy information of the PS anchors found in the beacon group of the device P.

Figure 7:
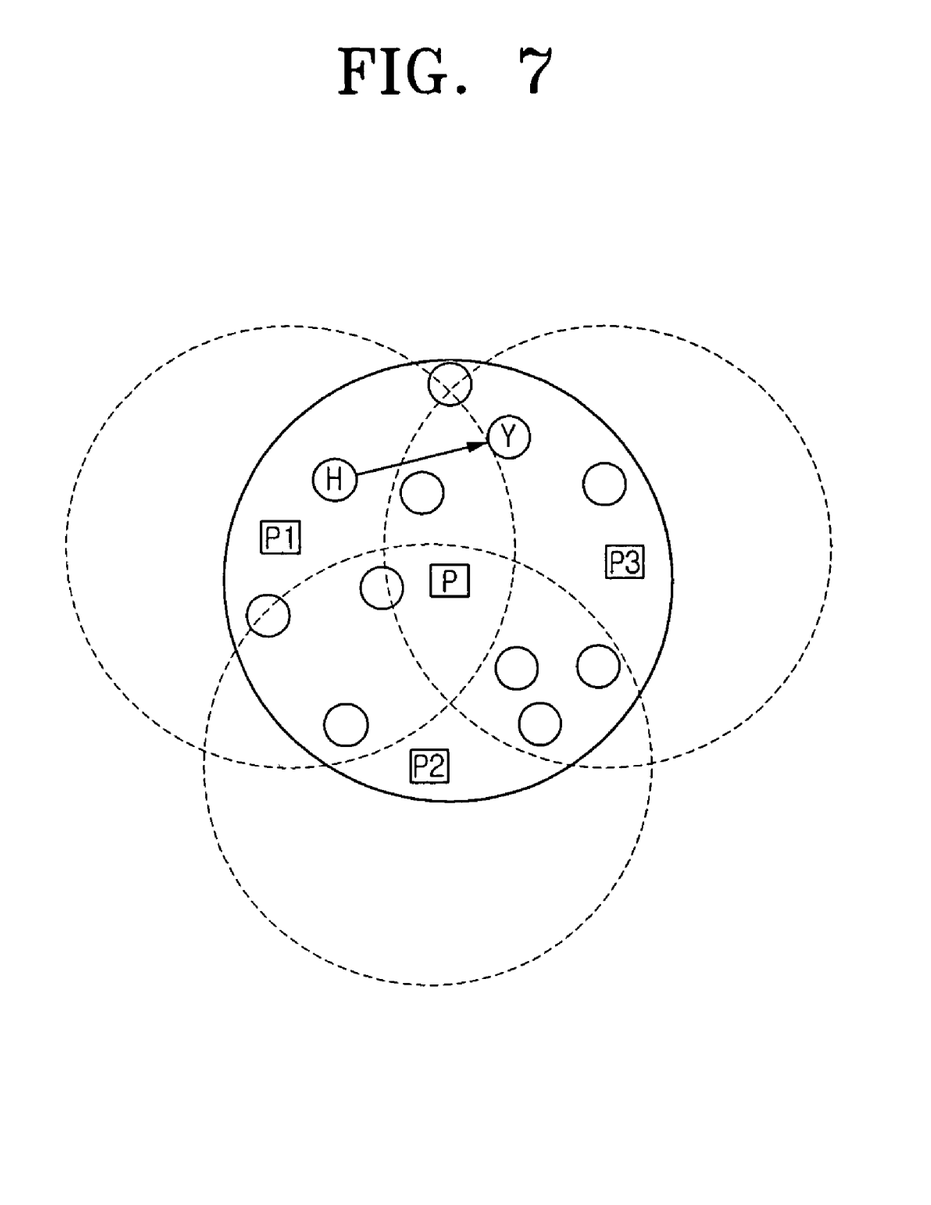
FIG. 7 is a view illustrating a network that includes an operating PS anchor.

FIG. 7 is a view illustrating a network that includes operating PS anchors.

Referring to FIG. 7, the beacon group of the device P includes the operating PS anchors P1, P2 and P3. The device P located in the center of the beacon group intends to become the PS anchor.

The device H is a hibernating device, and the device Y intends to communicate with the hibernating device H.

The device Y can receive the power save information element from the PS anchor P3, but cannot receive the power save information element from the PS anchor P1. Accordingly, it cannot be confirmed whether the hibernating device H is in the hibernating state. In this case, if the device P operates as the PS anchor, the unnecessary attempts of the device Y to communicate with the hibernating device H can be reduced.

As described above, if there is even one pair of devices (for example, devices Y and H) that are not simultaneously confirmed by one PS anchor in the beacon group, it is useful for the device to operate as the PS anchor.

Figure 8:
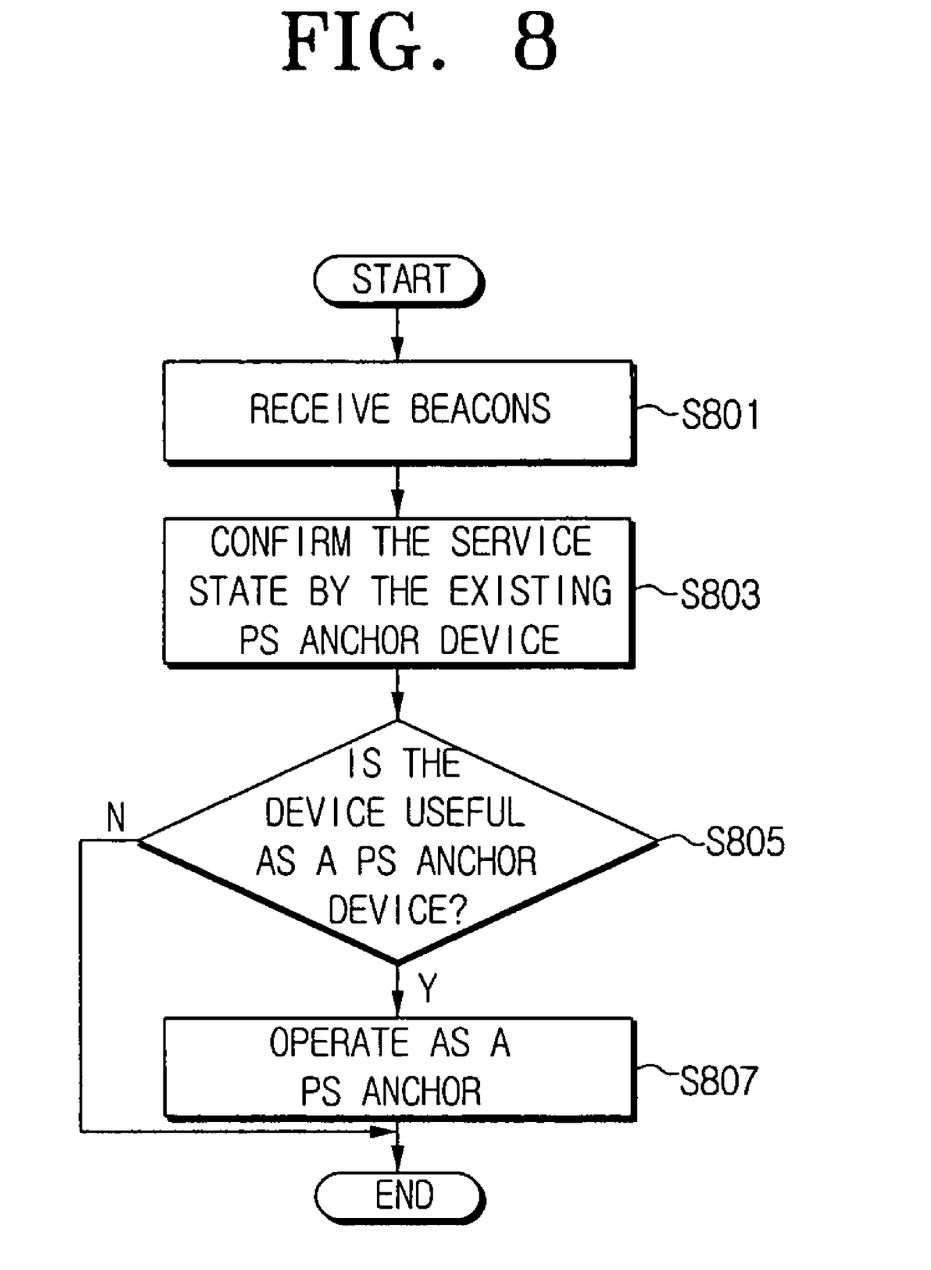
FIG. 8 is a flowchart explaining a method whereby a device P operates as a PS anchor if PS anchors exist in a beacon group.

FIG. 8 is a flowchart explaining the method whereby the device P operates as the PS anchor if PS anchors exist in a beacon group.

The device P receives beacons from neighboring devices in the beacon group, and receives power save information elements from the PS anchors P1, P2 and P3 (step S801).

The device P judges whether all pairs of devices in the beacon group of the device P can receive the power save information elements from the operating PS anchors. This can be judged by pairing the neighboring devices existing in the beacon period occupancy information of the device P and confirming whether the pairs of the neighboring devices exist in the beacon period occupancy information of other PS anchors of the beacon group of the device P (step S803).

If all pairs of devices satisfy the step S803, all the pairs of devices in the beacon group of the device P can receive the power save information elements from the operating PS anchors, and thus the device P judges that it is useless to become the PS anchor. Meanwhile, if some pairs of devices exist outside the range of the operating PS anchors, the device P judges that it is useful to become the PS anchor (step S805).

The device P can become the PS anchor if it is useful to do so (step S807).

The above-described algorithm is performed by a future PS anchor after the PS anchor receives the beacons of the beacon period during several superframes. Accordingly, the PS anchor should have sufficient information about other PS anchors of the beacon group. The determination of whether to become the PS anchor is performed according to this information, and declared during the next beacon in the form of a power save information element. Additionally, a field of a beacon that reflects the characteristic of one device may be used to indicate that the corresponding device is the PS anchor.

Hereinafter, a method whereby a device that is operating as the PS anchor resigns the role of the PS anchor will be explained. Even the device that is operating as the PS anchor can resign the role of the PS anchor.

The device that is operating as a PS anchor should periodically confirm if it is required for the device to continuously operate as the PS anchor. This can be judged by the two different judgment methods in accordance with the existence/nonexistence of other PS anchors as explained with reference to FIGS. 6 and 8. If the PS anchor judges that even one of the two judgment methods is not satisfied, it can resign the role of the PS anchor.

According to the present invention, the device that switches from the active mode to the hibernating mode operates as follows.

The operation performed by a device in the hibernating mode is the same as that explained according to the related art. The device that proceeds to the hibernating mode should declare information about its proceeding to the hibernating mode through its beacon. The information is noticed by all PS anchors and included in the power save information element being broadcasted thereafter. The hibernating device does not need to send or read the beacons during the superframes the number of which has been declared in the beacon of the hibernating device. The device that awakes from the hibernating mode should read all the beacons and the entire superframes in order to obtain the snapshot of the network and to reserve a DRP (Distributed Reservation Protocol).

Hereinafter, a method whereby one device communicates with another hibernating device will be explained.

For example, it is assumed that a device Y wants to communicate with a hibernating device H in a state that a device P is a PS anchor of a beacon group of the devices H and Y. In this case, the device Y may be in one of two situations.

The first situation is that when the device H declares to proceed to the hibernating mode, the device Y is in the network and has information about when the device H will awake.

The second situation is that the device Y comes to know that the device H is in the hibernating state through the power save information element of the PS anchor P as it moves to the beacon group of the device H. From the information, the device H comes to know for how many superframes the device H will be in the hibernating mode.

The device Y should postpone sending of frames until the device H awakes. In the superfame in which the device H awakes, the device Y receives the beacon of the device H, determines if it is still in the beacon group, and then transmits the frames. Accordingly, the device Y does not need to be continuously in the active mode in order to communicate with the device H or to attempt to communicate with the device H, and thus the power of the whole system can be reduced.

By the PS anchor according to the present invention, the device that awakes from the hibernating mode can obtain information about other devices that proceeded to the hibernating mode during its hibernating mode. Accordingly, the device does not need to be continuously in the active state in order to communicate with the hibernating devices or to attempt to communicate with the hibernating devices. This greatly contributes to the power save aspects of the entire system.

Additionally, even if there are devices having a high-degree of mobility with the constriction of the beacon group being frequently changed, the device can obtain information about the devices that are in the hibernating mode and the devices that are out of the beacon group, and can cope with such a situation.

According to the above-described methods, the power saving system in the distributed wireless personal area network can operate in a power save manner.

As described above, according to the present invention, methods whereby one device voluntarily operates as a PS anchor and resigns the role of the PS anchor are provided.

Additionally, according to the present invention, devices in the network can recognize information about the devices that are in the hibernating mode. Also, even if the device cannot obtain the information about the proceeding of the hibernating mode directly from the devices that are proceeding to the hibernating mode, it can obtain the information about the presently hibernating devices.

Additionally, according to the present invention, there is provided a method whereby the superframe during which a hibernating device switches over to an active mode can be recognized.

Accordingly, all devices in a given wireless personal area network can schedule their active modes and hibernating modes according to hibernating intervals of destination devices with which the devices want to communicate. This can effectively reduce the necessity of the devices' waiting for the destination devices to awake from the hibernating mode as the devices maintain their idle state. Accordingly, the power consumption of all the devices in the network can effectively be reduced.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A power saving method in a distributed wireless network, comprising:
   at least one device P becoming a PS (Power Save) anchor; and
   the PS anchor broadcasting device operation information which is the information about operation state of devices in a beacon group,
   wherein the device operation information comprises power save information comprising hibernation information about hibernating devices of the beacon group.

2. The power saving method as claimed in claim 1, wherein the hibernation information includes arrangement of information about the hibernating devices.

3. The power saving method as claimed in claim 2, wherein the information about the hibernating device is 3 bytes long.

4. The power saving method as claimed in claim 2, wherein the information about the hibernating device includes at least one of address information of the hibernating device and wake-up time information of the hibernating device which indicates a time that the hibernating device wakes up.

5. The power saving method as claimed in claim 4, wherein the wake-up time information of the hibernating device is about the number of remaining superframes before the hibernating device wakes up.

6. The power saving method as claimed in claim 5, wherein the address information of the hibernating device is 2 bytes long and the wakeup time information of the hibernating device is 1 byte long.

7. The power saving method as claimed in claim 2, wherein the power save information further comprises hibernation device beacon slot bitmap information which indicates the hibernating device by using a bitmap which contains mapped beacon slots of devices of the beacon group.

8. The power saving method as claimed in claim 7, wherein a bit of the bitmap is set to '1' for the beacon slot of the hibernating device.

9. The power saving method as claimed in claim 1, wherein the power save information further comprises at least one of information about the total length of the power save information, and an ID of the power save information.

10. The power saving method as claimed in claim 9, wherein the information about the total length of the power save information is 1 byte long, and the ID of the power save information is 1 byte long.

11. The power saving method as claimed in claim 1, wherein the power save information further comprises hibernating device beacon slot bitmap information which indicates the hibernating device by use of a bitmap which contains mapped beacon slots of devices of the beacon group.

12. The power saving method as claimed in claim 11, wherein a bit of the bitmap is set to '1' for the beacon slot of the hibernating device.

13. The power saving method as claimed in claim 1, wherein in the PS becoming step, the at least one device P voluntarily becomes the PS anchor.

14. A power saving method in a distributed wireless network, comprising:
   at least one device P becoming a PS (Power Save) anchor and broadcasting device operation information which is the information about operation state of devices in a beacon group,
   wherein the device operation information comprises power save information comprising hibernation information about hibernating devices of the beacon group.

15. The power saving method as claimed in claim 14, wherein the at least one device P voluntarily becomes the PS anchor.

16. A power saving method in a distributed wireless network, comprising:
   at least one device P voluntarily becoming a PS (Power Save) anchor and broadcasting information about operation state of devices in a beacon group; and
   at least one device in the beacon group being aware of the operation state of the corresponding device with which the device will communicate on the basis of the information and waiting in a power save state until communication with the corresponding device becomes possible.

17. The power saving method as claimed in claim 16, wherein the network is a wireless personal area network.

18. The power saving method as claimed in claim 16, wherein in the broadcasting step, the device P voluntarily becomes the PS anchor if presently operating PS anchors do not exist and at least one device other than the device P exists in the beacon group.

19. The power saving method as claimed in claim 16, wherein in the broadcasting step, the device P voluntarily become the PS anchor if presently operating PS anchors exist in the beacon group but all the devices in the beacon group cannot receive the information about the operation state from the presently operating PS anchor.

20. The power saving method as claimed in claim 19, wherein if all the devices cannot receive the information about the operation state, there are combinations that are not simultaneously confirmed by the beacons broadcast by any one of the operating PS anchors among combinations each of which is composed of two certain devices in the beacon group.

21. The power saving method as claimed in claim 16, wherein the device P either continuously receives power required for its operation or includes a power supply device that provides the power required for its operation.

22. The power saving method as claimed in claim 16, wherein the device P has a sufficient memory to store the operation state of all the devices in the beacon group and at least one byte for the information in its own beacon.

23. The power saving method as claimed in claim 16, wherein the device P does not proceed to the power save state in which the device P does not transmit the beacon while the device P operates as the PS anchor.

24. The power saving method as claimed in claim 16, wherein the information about the operation state includes information about the devices that are in a hibernating mode as the devices existing in the beacon group and information about time points where the devices switch from the hibernating mode to an active mode.

25. The power saving method as claimed in claim 24, wherein the information about the operation state is in the form of an information element included in the beacon broadcast by the PS anchor.

26. The power saving method as claimed in claim 25, wherein the information element includes a field for indicating the hibernating device among the devices in the beacon group in a unit of at least one bit, and a field including information about a time point where the device switches from the hibernating mode to the active mode in a unit of at least one byte corresponding to the unit of at least one bit.

27. The power saving method as claimed in claim 24, wherein the information about the operation state is obtained by receiving the beacon of the device in the beacon group and the beacons of other PS anchors in the beacon group during at least one superframe.

28. The power saving method as claimed in claim 16, further comprising the step of the device P operating as the PS anchor and then resigning the role of the PS anchor after a predetermined condition occurs.

29. The power saving method as claimed in claim 28, wherein the predetermined condition corresponds to either of a case that other devices do not exist in the beacon group and a case that other operating PS anchors exist in the beacon group and all the devices in the beacon group can receive the information about the operation state from the other operating PS anchors.

30. A power saving system in a distributed wireless network based on a wireless mobile ad-hoc network, the system comprising:
a device P for voluntarily selecting a role of a PS (Power Save) anchor that broadcasts information about operation state of devices in a beacon group; and
at least one neighboring device that waits in a power save state until communication with the corresponding device becomes possible in accordance with the operation state of the corresponding device with which the device will communicate according to the information.

31. The power saving system as claimed in claim 30, wherein the network is a UWB (Ultra Wide Band) wireless personal area network.

32. The power saving system as claimed in claim 30, wherein the device P selects the role of the PS anchor if presently operating PS anchors do not exist and at least one neighboring device that is not the device P exists in the beacon group.

33. The power saving system as claimed in claim 30, wherein the device P selects the role of the PS anchor if presently operating PS anchors exist in the beacon group but all the devices in the beacon group cannot receive the information about the operation state from the presently operating PS anchors.

34. The power saving system as claimed in claim 33, wherein if the devices cannot receive the information about the operation state, there are combinations that are not simultaneously confirmed by the beacons broadcast by any one of the operating PS anchors among combinations each of which is composed of two certain devices in the beacon group.

35. The power saving system as claimed in claim 30, wherein the device P either continuously receives power required for its operation or includes a power supply device that provides the power required for its operation.

36. The power saving system as claimed in claim 30, wherein the device P has a memory sufficient to store the operation state of all the devices in the beacon group and at least one byte for the information in its own beacon.

37. The power saving system as claimed in claim 30, wherein the device P does not proceed to the power save state in which the device P does not transmit the beacon while the device P operates as the PS anchor.

38. The power saving system as claimed in claim 30, wherein the information about the operation state includes information about the devices that are in a hibernating mode as the devices existing in the beacon group and information about time points where the devices switch from the hibernating mode to an active mode.

39. The power saving system as claimed in claim 38, wherein the information about the operation state is in the form of an information element included in the beacon broadcast by the PS anchor.

40. The power saving system as claimed in claim 39, wherein the information element includes a field for indicating the hibernating device among the devices in the beacon group in a unit of at least one bit, and a field including information about a time point where the device switches from the hibernating mode to the active node in a unit of at least one byte corresponding to the unit of at least one bit.

41. The power saving system as claimed in claim 38, wherein the information about the operation state is obtained by receiving the beacon of the device in the beacon group and the beacons of the other PS anchors in the beacon group during at least one superframe.

42. The power saving system as claimed in claim 30, wherein the device P operates as the PS anchor and then resigns the role of the PS anchor after a predetermined condition occurs.

43. The power saving system as claimed in claim 42, wherein the predetermined condition corresponds to either of a case that other devices do not exist in the beacon group and a case that other operating PS anchors exist in the beacon group and all the devices in the beacon group can receive the information about the operation state from the other operating PS anchors.

44. The power saving method as claimed in claim 16, wherein in the at least one device P voluntarily becoming the PS anchor, the at least one device P voluntarily nominates itself as the PS anchor of the beacon group.

45. The power saving method as claimed in claim 16, wherein in the at least one device in the beacon group being aware of the operation state of the corresponding device with which the device will communicate, the at least one device waits in the power save state on the basis of the information broadcast by the at least one device P, wherein the information indicates that the corresponding device is in a power save state, and the at least one device awakens from the power save state to communicate with the corresponding device when the corresponding device awakens from its power save state based on the information broadcast by the at least one device P.

46. The power saving system as claimed in claim 30, wherein the device P voluntarily elects itself as the PS anchor of the beacon group.

47. The power saving system as claimed in claim 30, wherein in the at least one neighboring device waits in the power save state if the information indicates that the corresponding device is in a power save state, and the at least one neighboring device awakens from the power save state to communicate with the corresponding device when the corresponding device awakens from its power save state based on the information broadcast by the device P.

48. The power saving method as claimed in claim 1, wherein the PS anchor broadcasts the device operation information independent of any request from the devices in the beacon group.

49. The power saving method as claimed in claim 14, wherein the PS anchor broadcasts the device operation information independent of any request from the devices in the beacon group.

* * * * *